Figure 1:
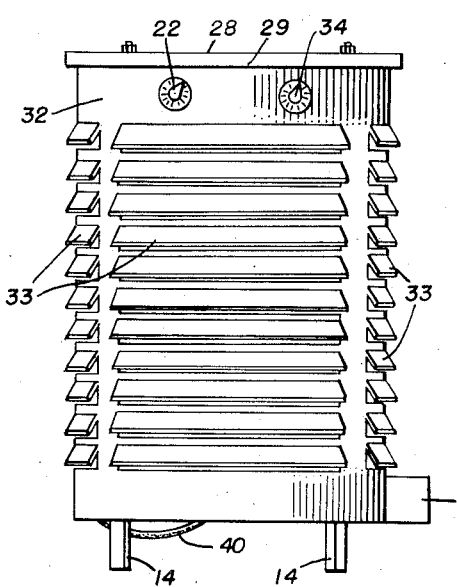

May 3, 1949.　　　H. L. BLACKWELDER　　　2,469,149
SPACE HEATER

Filed Feb. 20, 1947　　　　　　　　　　2 Sheets-Sheet 1

Inventor

Horace L. Blackwelder

By Clarence A. O'Brien
and Harvey B. Jacobson
Attorneys

May 3, 1949.　　　H. L. BLACKWELDER　　　2,469,149
SPACE HEATER
Filed Feb. 20, 1947　　　　　　　　　　　　2 Sheets-Sheet 2
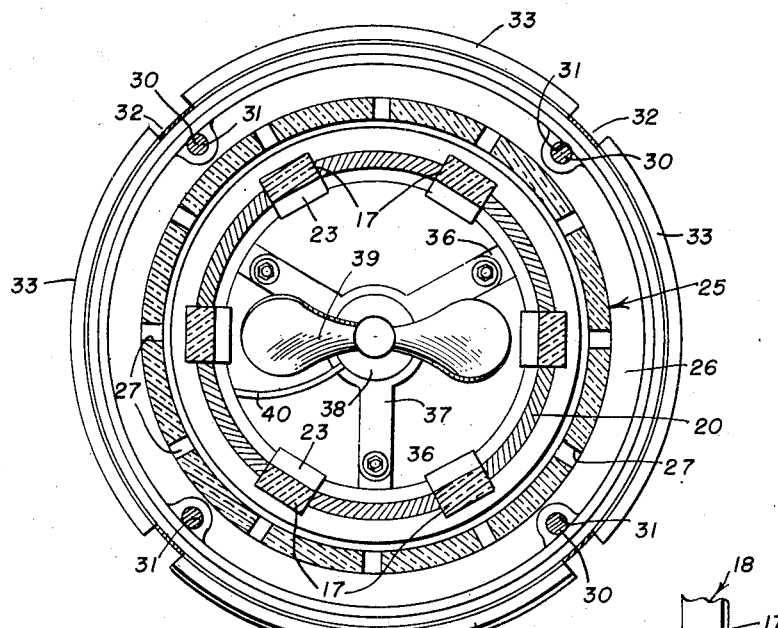
Fig. 5.
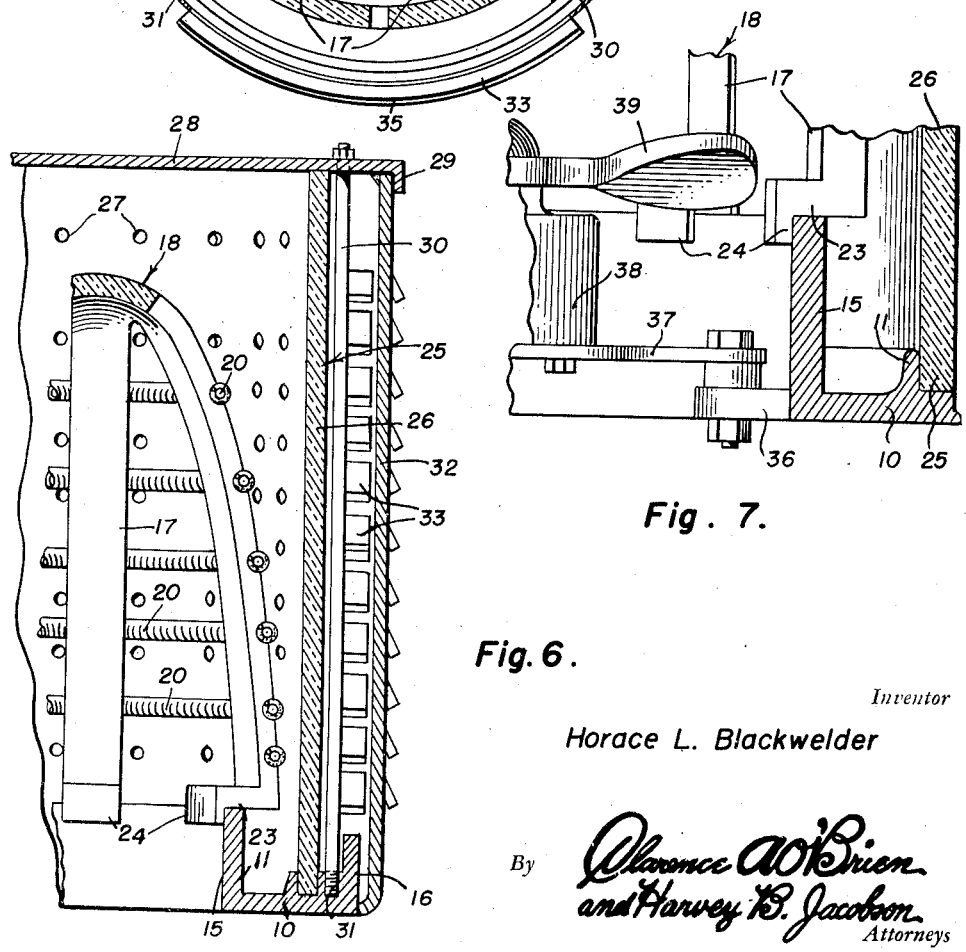
Fig. 7.
Fig. 6.
Inventor
Horace L. Blackwelder
By Clarence A. O'Brien
and Harvey B. Jacobson
Attorneys Patented May 3, 1949

2,469,149

UNITED STATES PATENT OFFICE 2,469,149

SPACE HEATER

Horace L. Blackwelder, Salisbury, N. C.

Application February 20, 1947, Serial No. 729,872

3 Claims. (Cl. 219—39)

This invention relates to a space heater and more particularly to a portable electric heater.

The primary object of the invention is to afford a portable electric heater capable of being plugged in and operated from any suitable electric power outlet of the type conventionally employed for supplying electric power to appliances, such as lamps, irons, toasters and similar equipment.

Another object is properly to humidify the atmosphere in the space to be heated in order to increase the efficiency of the device and supply clean warm air free from dust, smoke, dirt and odors commonly associated with portable heaters employing kerosene and like fuels.

The above and other objects may be attained by employing this invention which embodies among its features a trough adapted to contain water, a perforated porous humidifier rising from said trough with its lower end immersed in the water contained in the trough and a heating unit supported by the trough near the humidifier whereby air heated by the heating unit and passing through the perforations in the humidifier will be moistened.

Other features include means to produce a flow of air around the heating unit and through the perforations in the humidifier and means to direct the heated air through the said perforations, and into the surrounding atmosphere.

Figure 2:
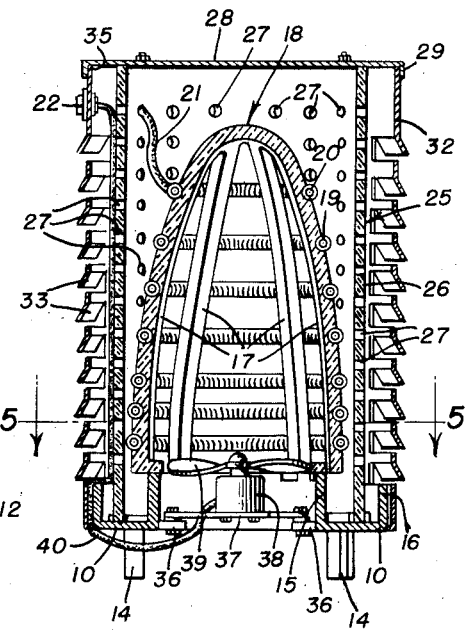
Figure 3:
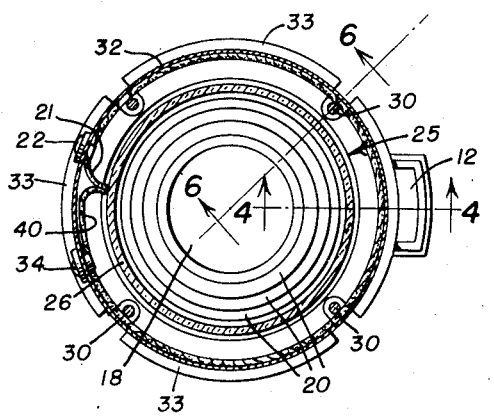
Figure 4:
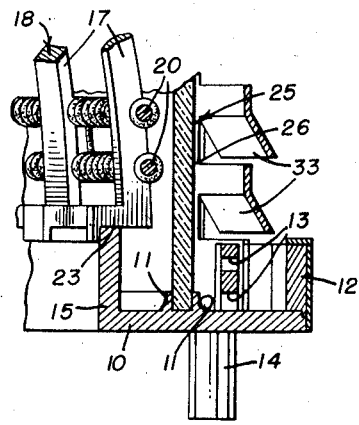

In the drawings,

Figure 1 is a side view of a heater embodying the features of this invention,

Figure 2 is a vertical sectional view through the heater illustrated in Figure 1, Figure 3 is a horizontal sectional view through the heater illustrated in Figure 1, Figure 4 is an enlarged fragmentary sectional view taken substantially along the line 4—4 of Figure 3, Figure 5 is an enlarged horizontal sectional view taken substantially along the line 5—5 of Figure 2, Figure 6 is an enlarged fragmentary sectional view taken substantially along the line 6—6 of Figure 3, and Figure 7 is an enlarged detailed view showing the fan mounting in detail.

Referring to the drawings in detail, a trough 10 of ring-like formation is provided on its bottom wall with a pair of spaced concentric upstanding flanges 11, and extending radially from said trough is a filling chamber 12 which has communication with the interior of the trough through horizontally spaced openings 13 which extend through the outer wall of the trough as will be readily understood upon reference to Figure 4. This trough 10 may be formed of any suitable material and has attached to its underside at radially spaced points legs 14 which together with the trough form a stand for the heating unit and the humidifier to be more fully hereinafter described. As illustrated, the inner wall 15 of the trough is of annular formation and lies in spaced concentric relation with the outer wall 16. The inner wall 15 is also of greater height than the outer wall 16 so as to form a seat for the electric heater to be more fully hereinafter described.

Seated on the upper edge of the wall 15 are the lower ends of the legs 17 of a spider designated generally 18 which is preferably formed of a heat resistant non-conducting material such as a ceramic. As illustrated in the drawings, the legs 17 of the spider curve upwardly and inwardly to form a substantially dome-shaped structure, and each leg is provided on its outer side with longitudinally spaced grooves 19 in which heating coils 20 are adapted to seat. These heating coils are coupled through a suitable conductor 21 through a switch 22 to any suitable source of power supply, so that the coils 20 may be energized and heat the surrounding atmosphere.

Each leg 17 of the spider 18 is provided at its lower end with an inwardly extending arm 23 which as illustrated in Figures 2, 4 and 6 rests on the upper edge of the wall 15 and is provided with a downturned lug 24 for engagement with the inner face of the wall. It will thus be seen that the spider will be located concentrically with relation to the trough 10.

Seated in the annular face formed between the upstanding flanges 11 of the trough 10 is the lower end of a tubular humidifier designated generally 25. This humidifier comprises a porous body, preferably of ceramic material, 26 of tubular form and formed at spaced intervals in the body 26 are radial openings 27 through which air heated by the heating coils 20 is adapted to escape into the surrounding atmosphere. It is to be noted that the flanges 11 are of considerably less height than the walls 15 and 16 of the trough 10 so that when water is placed in the trough, the lower end of the humidifier 25 will be immersed therein. A cap or cover 28 closes the upper end of the humidifier 25 so that air passing upwardly through the spider 18 will be directed outwardly through the openings 27 previously referred to. The cover 28 constitutes a disc-like body provided at its peripheral edge with a downturned flange 29 which serves to hold in place the casing, to be more fully hereinafter described. The cover 28 is pierced at spaced intervals to receive the upper ends of tie bolts 30, the lower ends of which are threaded into internally screw threaded sockets 31 formed in the trough 10 in longitudinal alignment with the openings in the cover.

In order to protect the humidifier 25 from injury and also to improve the finished appearance of the unit, I provide a tubular jacket 32 which is provided with radially spaced rows of longitudinally spaced louvers 33 through which the heated and humidified air passing through the openings 27 escapes to the surrounding atmosphere. The upper portion of the jacket 32 serves as a support for the control switch 22 of the electric heater and also for a control switch 34 for the fan to be more fully hereinafter described. As illustrated, the jacket 32 is supported in spaced concentric relation to the humidifier 25 with its upper end welded as at 35 to the cover 28.

While the heater so far described will function satisfactorily to warm an enclosed space through convection, I find it to be far more efficient when a fan is employed to circulate the air through the heater. To this end I provide on the trough 10 at radially spaced intervals inwardly extending lugs 36 which serve to support the spider 37 carrying a fan motor 38 to the upper end of the shaft of which is attached a fan 39. As illustrated in the drawings, the axis of the shaft of the motor 38 coincides with the longitudinal axis of the heater, and the fan is located in such a position that the blades thereof travel in a horizontal plane which coincides with the lower ends of the legs 17 of the spider. It will thus be seen that when the fan is set into operation, a draft of air will be produced upwardly through the heater. The fan motor 38 is coupled through the medium of a suitable conductor containing cable 40 with the switch 34 so that the operation of the fan may be governed independently of the operation of the heater. It will be understood of course, that the fan motor as well as the heater may be served through a conventional power cable or attachment cord which will be plugged into a convenient power outlet of the type ordinarily employed.

In use, it will be understood that the heater is transported to the enclosed space to be heated and the power supply cable thereof plugged into a convenient power outlet. Upon manipulating the switch 22, the heating coils 20 will be energized so that air entering the bottom of the heating unit will contact the heating coils 20 and flow upwardly and then out through the passages 27 and louvers 33 to the surrounding atmosphere. The upward flow of the heated air will cause cooler air to flow in at the bottom and the heater may be operated solely by convection. In order, however, to increase the efficiency of the heater, the switch 34 may be manipulated to energize the motor 38 and drive the fan 39, thus creating a forced circulation of air through the heater. Water is placed in the trough 10, and by reason of the immersion of the lower end of the humidifier 25 therein, and the capillary effect of the pores in the body thereof it will be obvious that air passing through the openings 27 will absorb moisture from the humidifier, thus improving the heating effect and the health of the occupants of the room or space being heated. Obviously, if so desired, the fan 39 may be run without turning on the heating coils in order to effect a cooling of the space, if so desired.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A space heater comprising a ring-shaped trough adapted to contain water, a perforated porous tubular humidifier rising from the trough with the lower end thereof immersed in water contained in said trough, a heating unit supported on the trough near the humidifier whereby air heated by the heating unit and passing through the perforations in the humidifier will be moistened, and a motor driven fan supported by the trough near the lower end of the humidifier to produce a flow of air axially of the humidifier and around the heating unit.

2. A space heater comprising a ring-shaped trough adapted to contain water, a perforated porous tubular humidifier rising from the trough with its lower end immersed in water contained in said trough, a heating unit supported on the trough near the humidifier whereby air heated by the heating unit and passing through the perforations in the humidifier will be moistened, a motor driven fan supported by the trough near the lower end of the humidifier to produce a flow of air axially of the humidifier and around the heating unit, and a louvered jacket carried by the trough and enclosing the humidifier in concentric spaced relation therewith.

3. A space heater comprising a ring-shaped trough adapted to contain water, a perforated porous tubular humidifier rising from the trough with the lower end thereof immersed in water contained in said trough, a dome-shaped spider supported on the trough in concentric spaced relation within the humidifier, an electrical heating coil wound about the spider, a motor driven fan supported by the trough near the base of the spider for producing a flow of air axially thereof and a louvered jacket surrounding the humidifier in concentric spaced relation therewith.

HORACE L. BLACKWELDER.

REFERENCES CITED

The following references are of record in the file of this patent:

UNITED STATES PATENTS

| Number | Name | Date |
|---|---|---|
| 1,431,719 | Brown | Oct. 10, 1922 |
| 1,535,287 | Beeler | Apr. 28, 1925 |
| 1,669,588 | Burns et al. | May 15, 1928 |
| 1,712,204 | Gibney | May 7, 1929 |
| 1,893,954 | Lorenz et al. | Jan. 10, 1933 |